US012712290B2

(12) United States Patent
Forstmeier et al.

(10) Patent No.: US 12,712,290 B2
(45) Date of Patent: Aug. 18, 2026

(54) WELDED JOINT ARRANGEMENT FOR COOLED POWER TRANSMISSION

(71) Applicant: Lisa Draexlmaier GmbH, Vilsbiburg (DE)

(72) Inventors: Christoph Forstmeier, Landshut (DE); Tobias Ingerl, Rohr (DE); Norbert Klein, Essenbach (DE)

( * ) Notice: Subject to any disclaimer, the term of this patent is extended or adjusted under 35 U.S.C. 154(b) by 374 days.

(21) Appl. No.: 18/515,483

(22) Filed: Nov. 21, 2023

(65) Prior Publication Data

US 2024/0178580 A1 May 30, 2024

(30) Foreign Application Priority Data

Nov. 24, 2022 (DE) ......................... 102022131094.9

(51) Int. Cl.

*H01R 4/02* (2006.01)
*H01B 7/00* (2006.01)
*H01R 13/00* (2006.01)

(52) U.S. Cl.

CPC ........... *H01R 4/029* (2013.01); *H01B 7/0072* (2013.01); *H01R 4/028* (2013.01); *H01R 13/005* (2013.01)

(58) Field of Classification Search

CPC .. H01B 7/0072; H01R 24/566; H01R 13/005; H01R 4/029

See application file for complete search history.

(56) References Cited

U.S. PATENT DOCUMENTS

| | | | | | |
|---|---|---|---|---|---|
| 1,674,829 | A * | 6/1928 | La Bean | H01R 11/11 | 174/15.7 |
| 3,656,092 | A * | 4/1972 | Swengel, Sr. | H01R 4/723 | 439/730 |
| 4,018,976 | A * | 4/1977 | Grove | H01B 7/29 | 174/15.7 |
| 4,487,990 | A * | 12/1984 | Lane | H01R 9/11 | 174/15.7 |
| 5,229,543 | A * | 7/1993 | Strefling | H01R 13/005 | 29/862 |
| 5,317,804 | A * | 6/1994 | Kasper | H01R 11/11 | 29/868 |
| 5,581,878 | A * | 12/1996 | Langhenry | H01B 7/425 | 29/857 |

(Continued)

*Primary Examiner* — Ross N Gushi

(74) *Attorney, Agent, or Firm* — BelayIP

(57) ABSTRACT

A welded connection arrangement for cooled current transmission is disclosed. The welded connection arrangement includes a tubular electrical line designed to conduct current from an electrical load, such as a charging socket, to a storage medium, such as a battery. The tubular electrical line includes a first end for connection to the electrical consumer and a second end for connection to the storage medium. The tubular electrical line is furthermore designed to accommodate a coolant for cooling the tubular electrical line. The weld connection arrangement includes an electrically conductive contact part attached to a respective end of the tubular electrical line in order to contact the same electrically. The weld connection arrangement includes a sealing plug inserted into the tubular electrical line at the respective end and, together with the electrically conductive contact part, is welded to the tubular electrical line in order to seal the tubular electrical line against leakage of coolant.

18 Claims, 6 Drawing Sheets

(56) References Cited

U.S. PATENT DOCUMENTS 5,612,508 A * 3/1997 Kasper .................. H01R 4/187 174/15.6
5,780,770 A * 7/1998 Christianson ............ H01R 9/11 174/15.1
5,795,188 A * 8/1998 Harwath .............. H01R 24/566 439/583
5,938,474 A * 8/1999 Nelson ................. H01R 9/0521 439/578
6,100,467 A * 8/2000 Kroulik .................... H01R 9/11 174/15.1
6,133,532 A * 10/2000 Lundback ............ H01R 24/564 439/578
6,293,594 B1 * 9/2001 Safarevich ............... A61N 1/05 174/94 R
6,386,915 B1 * 5/2002 Nelson ................. H01R 24/564 439/583
6,431,911 B2 * 8/2002 Pitschi ................. H01R 24/566 439/433
6,538,203 B1 * 3/2003 Nolle ................... H01R 11/283 174/84 C
6,976,872 B1 * 12/2005 Wild .................. H01R 13/5205 439/578
7,008,264 B2 * 3/2006 Wild .................... H01R 24/566 439/578
7,121,881 B2 * 10/2006 Jones ................... H01R 24/542 439/429
7,134,189 B2 * 11/2006 Buenz .................... H01R 43/28 29/748
7,357,671 B2 * 4/2008 Wild .................... H01R 9/0521 439/583
7,934,954 B1 * 5/2011 Chawgo ................. H01R 24/56 439/585
8,177,582 B2 * 5/2012 Amidon ................. H01R 43/28 29/857
8,298,006 B2 * 10/2012 Wild ...................... H01R 13/17 439/675
8,388,375 B2 * 3/2013 Chawgo ................. H01R 24/38 439/585
8,448,836 B2 * 5/2013 Schloms ............ H01R 43/0207 228/110.1
8,840,437 B2 * 9/2014 Hentschel ............. H01R 4/029 439/874
8,956,184 B2 * 2/2015 Chawgo ............... H01R 9/0524 430/584
9,225,076 B2 * 12/2015 Froeschl .................. H01R 4/20
10,516,220 B2 * 12/2019 Harms ................. B23K 20/002
10,632,861 B2 * 4/2020 Beimdieck ........... H01R 13/005
10,873,171 B2 * 12/2020 Forstmeier ......... H01R 43/0214
10,943,711 B2 * 3/2021 Heyne .................... H01B 9/006
11,158,961 B2 * 10/2021 Forstmeier ........... B23K 20/122
11,394,163 B2 * 7/2022 Goetzmann ............ H01R 43/16
11,450,975 B2 * 9/2022 Wang ....................... H01R 4/62
11,456,092 B2 * 9/2022 Mayer .................... H01B 9/006
11,916,321 B2 * 2/2024 Ruda ...................... H01R 4/625
2006/0292922 A1 * 12/2006 Froschl .................. H01R 4/625 439/442
2019/0260145 A1 * 8/2019 Wang ..................... H01R 11/12
2021/0167563 A1 * 6/2021 Clausen ................. H01R 4/183

* cited by examiner

WELDED JOINT ARRANGEMENT FOR COOLED POWER TRANSMISSION

CROSS REFERENCE TO RELATED APPLICATIONS

This application claims priority to German Patent Application DE102022131094.9, filed Nov. 24, 2022, in the name of Lisa Dräxlmaier GmbH, the content of which is herein incorporated by reference.

BACKGROUND OF THE INVENTION

Field of the Invention

The present invention relates to a friction welding connection arrangement for cooled power transmission and a friction welding method for connecting an electrically conductive hollow body. The present invention further relates to a welded connection arrangement for cooled current transmission, for example from a charging socket or charging adapter to a battery of an electrically operable vehicle.

Description of Related Art

In electrically powered vehicles, electrical cables are used to electrically connect the vehicle's battery to the charging socket in order to charge the battery. These cables increasingly have to transmit large amounts of current in the shortest possible time, which leads to massive heating of the cable. As these electrical cables are currently not cooled, they must be designed with a correspondingly large cross-section to compensate for the electrical power loss. This leads to more material consumption due to the larger cross-sections required, i.e. a waste of resources, and lower charging performance during power transmission, i.e. loss of time and energy during the charging process.

Publication DE 102020 106415 A1 describes a friction-welded connector and a method for producing an electrical connection by joining a first contact part to a second contact part by means of a material bond.

Publication DE 102013 101876 B3 describes a method for joining a cable to a connecting element with a material bond and a cable configured according to the method.

BRIEF SUMMARY OF THE INVENTION

One task of the invention is therefore to create a concept for efficient power transmission between an electrical consumer and a storage medium, for example between the charging socket and the battery of the vehicle, by means of an electrical cable, in which the cable can be designed to conserve resources and also enables the storage medium or the battery to be charged quickly.

An inventive solution presented here is based on the idea of using a welded connection arrangement in order to achieve efficient cooling of the electrical line between the electrical consumer, for example the charging socket, and the storage medium, for example the battery. A hollow body or a tubular electrical cable, for example an aluminum tube, is used as the cable for transmitting electricity.

The respective cable connection is connected to a contact part by means of welding, preferably friction welding, and a filler pin (hereinafter also referred to as a plug), as explained in more detail below for FIGS. 1 and 2. In a special case, a rotationally symmetrical contact part (for example a friction welding tool "CCS DC PIN") can also be welded directly to the hollow body by means of friction welding, as explained in more detail below for FIG. 3.

A cooling medium can be placed in the waveguide, which allows the line to cool down when heated. A circulating cooling circuit with, for example, a water-glycol mixture or a closed filling of the waveguide with a latent heat storage medium (PCM phase change material) can be realized.

In the case of the circulating variant, connection openings must be provided radially on the waveguide or on the end face in the area of the contacting zone, as explained in more detail below for FIGS. 4, 5 and 6.

This inventive solution results in the technical advantages of low-loss and faster charging with higher charging currents, a reduction in the cable cross-section and thus weight savings and range optimization due to the higher charging currents and lower weight.

According to a first aspect, the task described above is solved by a welded connection arrangement for cooled current transmission from an electrical consumer, for example a charging socket, to a storage medium, for example a battery, for example a battery of an electrically operable vehicle, wherein the welded connection arrangement comprises the following: a tubular electrical lead which is designed to conduct electricity, the tubular electrical lead comprising a first end for electrical connection to the electrical consumer and a second end for electrical connection to the storage medium, and furthermore being designed to accommodate a coolant for cooling the tubular electrical lead; an electrically conductive contact member attached to a respective end of the tubular electrical conduit for electrically contacting the tubular electrical conduit; and a sealing plug inserted into the tubular electrical conduit at the respective end of the tubular electrical conduit and welded to the tubular electrical conduit together with the electrically conductive contact member to seal the tubular electrical conduit against leakage of coolant.

With this welded connection arrangement, an advantageous concept for efficient power transmission between an electrical consumer, for example a charging socket, and a storage medium, for example a battery, for example a battery of an electrically operated vehicle, is realized by means of an electrical line, in which the line can be designed to conserve resources and also enables rapid charging of the storage medium, for example the battery. It is understood that with this welded connection arrangement, instead of an electrical connection to a charging socket of a charging station or a battery charger, an electrical connection to a suitable charging adapter for charging the battery can also be realized. The charging socket is only mentioned here as an example of an electrical consumer. A variety of other electrical consumers can be used instead of the charging socket.

Efficient cooling of the electrical cable can be achieved with the welded connection arrangement. This makes it possible to achieve low-loss and faster charging with higher charging currents. The welded connection arrangement presented here makes it possible to reduce the conductor cross-section of the electrical cable and thus leads to weight savings. Due to the higher charging currents and the lower weight, the range of the electric cable can be increased, which leads to additional ease of use when charging the vehicle.

The tubular electrical cable can be formed from circular tubes, for example. Alternatively, it can be formed from square tubes. Support struts can be fitted inside the tubular electrical line in order to obtain the corresponding tube shape. Furthermore, chambers can be provided inside the tubular electrical conduit in order to guide the flow of coolant accordingly. For example, a first chamber may be configured to direct coolant in a first direction and a second chamber may be configured to direct coolant in the opposite direction to allow appropriate circulation of the coolant.

The sealing plug is also used here as a material filling pin, which supplies sufficient material to weld the electrical contact part and tubular electrical cable together so that no coolant can escape from the corresponding end of the cable.

According to an exemplary embodiment of the welded connection arrangement, the welded connection arrangement forms a friction-welded connection arrangement in which the electrically conductive contact part is friction-welded together with the sealing plug to the tubular electrical cable.

Such a friction welding connection arrangement is particularly advantageous when different metals are to be welded together. For example, a copper contact can be welded to an aluminum tube in an advantageous way.

According to an exemplary embodiment of the welded connection arrangement, the electrically conductive contact part and the tubular electrical cable consist of different metals that are welded together.

This has the technical advantage that the contact part and the electrical cable can have different electrical and mechanical properties. For example, the contact part can have very good electrical conductivity and the electrical cable can be lightweight and flexible.

According to an exemplary embodiment of the welded connection arrangement, the tubular electrical lead and the sealing plug are made of aluminum and the electrically conductive contact part is a copper part that is welded together with the aluminum of the tubular lead and the aluminum of the sealing plug.

This has the technical advantage that standard industrially producible electrical contact parts and industrially producible conduits can be used to construct the welded connection arrangement.

According to an exemplary embodiment of the welded connection arrangement, the electrically conductive contact part is welded to the tubular electrical cable by means of the sealing plug.

This has the technical advantage that the tubular electrical cable is hermetically sealed against coolant leakage.

According to an exemplary embodiment of the welded connection arrangement, the electrically conductive contact part has a first section and a second section which are mechanically and rigidly connected to each other; wherein the first section is tubular and is welded to the respective end of the tubular electrical line.

This has the technical advantage that the electrically conductive contact part can be flexibly connected to the storage medium, for example the battery or the electrical consumer, for example the charging socket, on the one hand and to the tubular electrical line on the other. The first contact part can be adapted to an electrical and mechanical connection of the storage medium or the electrical consumer, while the second contact part can be adapted to the tubular electrical cable.

According to an exemplary embodiment of the welded joint assembly, the first portion is a tubular hollow body welded to an outer surface of the tubular electrical conduit at the respective end of the tubular electrical conduit; wherein the sealing plug is attached to the respective end in the tubular electrical conduit and is welded to an inner surface of the tubular electrical conduit.

This achieves the technical advantage that the first section has the largest possible contact surface with the tubular hollow body, via which the current can flow. Secondly, the tubular electrical line can be efficiently sealed with the welded material of the sealing plug inserted inside the tubular electrical line so that no coolant escapes.

According to an exemplary embodiment of the welded connection arrangement, the second section is plate-shaped and has a hole for mechanical and electrical contacting.

This has the technical advantage that the plate-shaped connection of the second section forms a sufficiently large surface over which the current can flow when connected to the battery. The second section of the electrically conductive contact part can be easily and efficiently connected to the battery via the hole using a screw connection.

According to an exemplary embodiment of the weld connection arrangement, the first section is a rotationally symmetrical body that is welded at the respective end of the tubular electrical cable to the sealing plug on an inner surface of the tubular electrical cable.

This has the technical advantage that the first section can be firmly connected to the tubular electrical cable simply by means of a friction welding process using the sealing plug as a material filling pin.

According to an exemplary embodiment of the welded joint arrangement, the first section is shaped as a rotationally symmetrical friction welding tool.

This has the technical advantage that the electrically conductive contact part can be easily inserted into a friction welding machine, with which the welding can be carried out as a friction weld.

According to an exemplary embodiment of the welded connection arrangement, the second section is a rotationally symmetrical body that has a plug-in contact for mechanical and electrical contacting.

This has the technical advantage that the electrically conductive contact part can be easily connected to an electrical consumer or a charging socket with the second section. The electrical cable can be easily connected to the electrical consumer or the charging socket by plugging in the second section and can also be easily disconnected from the electrical consumer or the charging socket by disconnecting the second section.

According to an exemplary embodiment of the welding connection arrangement, the tubular electrical line has at least one lateral bore for introducing coolant; wherein a cooling connection is provided in the lateral bore for introducing or discharging the coolant into the tubular electrical line.

This has the technical advantage that coolant can efficiently enter or exit the tubular electrical cable via the side hole. The tubular electrical cable can therefore be cooled efficiently via the cooling connection.

According to an exemplary embodiment of the welding connection arrangement, the sealing plug has a cooling connection in order to introduce the coolant into the tubular electrical line.

This has the technical advantage that coolant can efficiently enter or exit the tubular electrical cable via the cooling connection on the sealing plug. The tubular electrical cable can therefore be cooled efficiently via the cooling connection. The cooling connection can also be attached flexibly, either to the sealing plug or to the lateral bore on the tubular electrical cable, or to both locations. One cooling connection can be used to introduce coolant and the other to discharge coolant. Alternatively, coolant can also be introduced and discharged via a cooling connection, for example if the tubular electrical cable has a chamber-like structure.

According to an exemplary embodiment of the welded connection arrangement, the tubular electrical cable has a T-shaped connection piece with three tubular cable connections at at least one of the ends.

This has the technical advantage of allowing flexible cable routing via the T-shaped connection piece. Different electrical cables and coolant lines can therefore be connected to each other at different levels.

According to an exemplary embodiment of the welded connection arrangement, a first line connection of the three tubular line connections is designed as a coolant connection, a second line connection of the three tubular line connections is welded to the electrically conductive contact part; and a third line connection of the three tubular line connections is welded to the tubular electrical line.

This has the technical advantage that the T-shaped connection piece has a prefabricated connection for a cooling line, so that it is no longer necessary to drill a hole for a cooling connection in the tubular electrical line.

The three cable connections can be designed flexibly. For example, the second and third line connections can be arranged in opposite directions to each other and the first line connection can run orthogonally to both. Alternatively, the first and second line connections can be arranged in opposite directions to each other and the third line connection can run orthogonally to both. Other geometries are of course not excluded.

According to a second aspect, the task described above is solved by a method for producing a welded connection arrangement for cooled current transmission from an electrical load, for example a charging socket, to a storage medium, for example a battery, for example a battery of an electrically operable vehicle, the method comprising the following steps: providing a tubular electrical line with a first end for electrical connection to the electrical consumer and a second end for electrical connection to the storage medium, wherein the tubular electrical line is designed to receive coolant; inserting a sealing plug at a respective end of the tubular electrical line into the tubular electrical line; attaching an electrically conductive contact portion to a respective end of the tubular electrical conduit for electrically contacting the tubular electrical conduit; and welding the plug together with the electrically conductive contact portion to the tubular electrical conduit at the respective end of the tubular electrical conduit to seal the same against leakage of coolant.

With this method, an advantageous concept for efficient power transmission between an electrical consumer, for example a charging socket, and a storage medium, for example a battery, for example a battery of an electrically operated vehicle, is realized by means of a welded connection arrangement, in which the line can be designed to conserve resources and also enables rapid charging of the storage medium or the battery.

The process allows the production of a welded connection arrangement with which efficient cooling of the electrical cable can be realized. With a welded connection arrangement manufactured in this way, low-loss and faster charging with higher charging currents can be realized. As already described above, the welded connection arrangement presented here allows the conductor cross-section of the electrical cable to be reduced and thus leads to weight savings. Due to the higher charging currents and the lower weight, the range of the electric cable can be increased, which leads to additional ease of use when charging the vehicle.

According to an exemplary embodiment of the method, the welding comprises friction welding, in which the electrically conductive contact part together with the sealing plug is friction welded to the tubular electrical cable.

Friction welding is particularly advantageous when different metals are to be welded together. For example, a copper contact can be welded to an aluminum tube in an advantageous way.

According to an exemplary embodiment of the method, the method comprises attaching a cooling connection to the tubular electrical conduit and introducing or discharging coolant into the tubular electrical conduit via the cooling connection.

This has the technical advantage that coolant can efficiently enter or exit the tubular electrical cable via the cooling connection. The tubular electrical cable can therefore be cooled efficiently via the cooling connection.

BRIEF DESCRIPTION OF THE SEVERAL VIEWS OF THE DRAWINGS

Further advantages, features, and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, without departing from the scope of the disclosure. An advantageous embodiment of the present invention is set out below with reference to the accompanying figures, wherein.

The figures are merely schematic representations and serve only to explain the invention. Identical or similarly acting elements are consistently provided with the same reference signs.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of A, B, and C" should be understood as including only one of A, only one of B, only one of C, or any combination of A, B, and C.

In the following detailed description, reference is made to the accompanying drawings, which form a part thereof and in which specific embodiments in which the invention may be practiced are shown by way of illustration. It is understood that other embodiments may be utilized and structural or logical changes may be made without departing from the concept of the present invention. The following detailed description is therefore not to be understood in a limiting sense. Furthermore, it is to be understood that the features of the various embodiments described herein may be combined with each other, unless specifically stated otherwise.

The aspects and embodiments are described with reference to the drawings, wherein like reference signs generally refer to like elements. In the following description, numerous specific details are set forth for explanatory purposes in order to provide an in-depth understanding of one or more aspects of the invention. However, it may be apparent to one skilled in the art that one or more aspects or embodiments may be carried out with a lesser degree of specific detail. In other instances, known structures and elements are shown in schematic form to facilitate the description of one or more aspects or embodiments. It will be understood that other embodiments may be utilized and structural or logical changes may be made without departing from the concept of the present invention.

Figure 1:
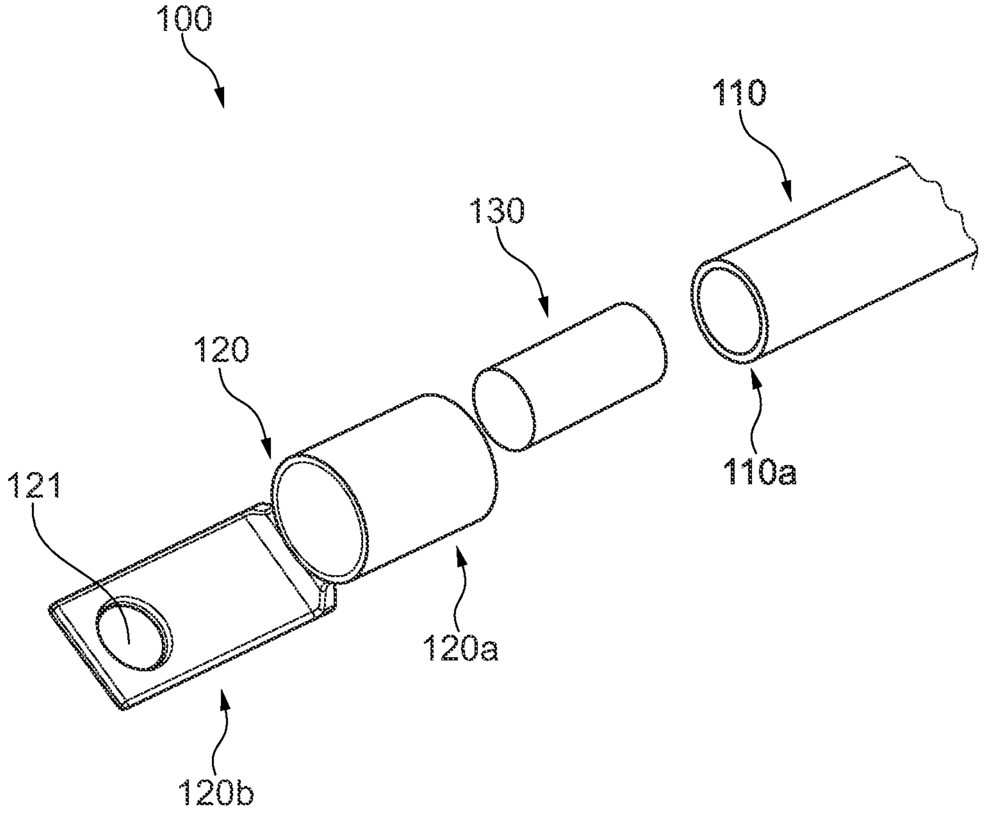
FIG. 1 depicts an exploded view of the connection zone of a welded connection arrangement 100 according to the invention.

FIG. 1 shows an exploded view of the connection zone of a welded joint arrangement 100 according to the invention.

A hollow body 110 (for example a tube made of aluminum) is used as a line for transmitting electricity, which is also referred to below as a tubular electrical line 110. The respective cable connection is connected to a contact part 120 by means of friction welding and a filler pin 130, also referred to below as a sealing plug 130.

A cooling medium can be placed in the pipe 110, which allows the pipe to cool down when heated.

FIG. 1 shows the connection zone or joining zone in more detail as an exploded view.

Figure 2:
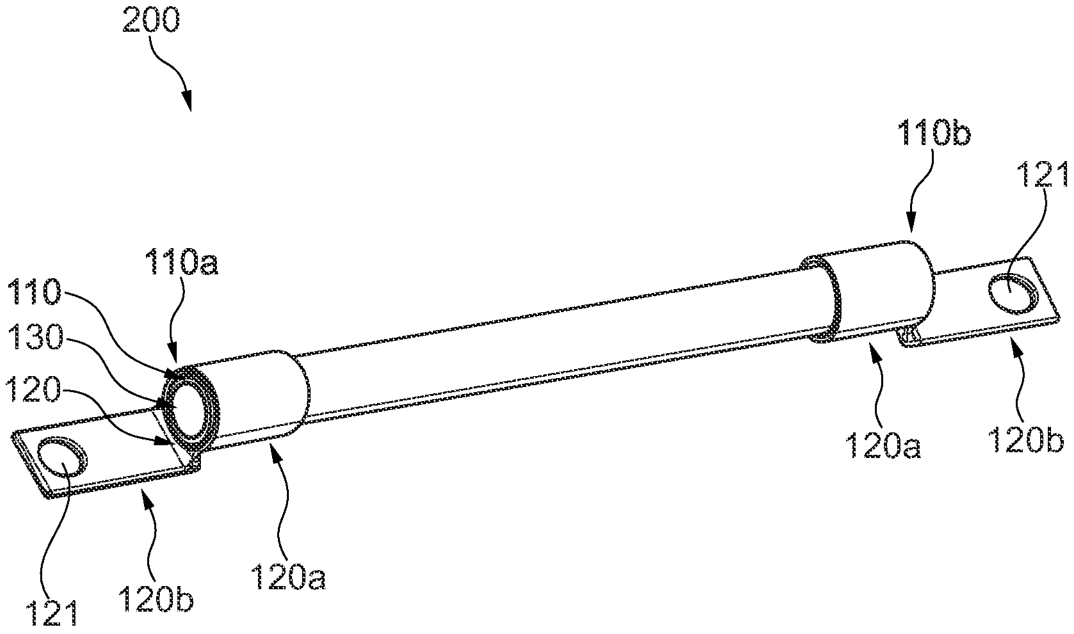
FIG. 2 depicts a schematic representation of a welded joint arrangement 200 according to the invention, in which both ends 110*a*, 110*b* are in contact.

A copper contact part 120 serves as a possible screw-on point in the vehicle. The aluminum tube 110 serves on the one hand as a conductor and thus current carrier, on the other hand it can be filled with a cooling medium. The aluminum filler pin 130 serves as filler material for the friction welding process in order to completely close the joining zone. Closing the two joining zones, as shown in FIG. 2, creates a hollow area between the two contacts 121, which can be filled with a cooling medium.

In the following, the welded joint arrangement 100 is described in more detail in a more general embodiment.

The welded connection arrangement 100 is used for cooled power transmission from an electrical consumer, for example a charging socket, to a storage medium, for example a battery, for example a battery of an electrically operated vehicle. However, it can also be used for other purposes, for example for any type of power transmission that is associated with particular heat generation, so that cooling is necessary. Examples include use in electric motors, in a heat pump, in underfloor heating, in air conditioning units and in many other applications.

The welding connection arrangement 100 comprises a tubular electrical line 110, which is designed to conduct current from the electrical consumer, for example the charging socket, to the storage medium, for example the battery. The tubular electrical line 110 comprises a first end 110*a* for electrical connection to the electrical consumer, for example the charging socket, and a second end 110*b* for electrical connection to the storage medium, for example the battery. Only the first end 110*a* is shown in FIG. 1; both ends 110*a* and 110*b* are shown in FIG. 2. The second end 110*b* can be constructed analogously. The tubular electrical line 110 is also designed to accommodate a coolant for cooling the tubular electrical line 110.

The weld connection arrangement 100 comprises an electrically conductive contact part 120, which is attached to a respective end 110*a*, 110*b* of the tubular electrical line 110 in order to make electrical contact with the tubular electrical line 110. At the first end 110*a*, for example, an electrical contact can be made with the storage medium or the battery and at the second end 110*b* an electrical contact can be made with the electrical consumer or the charging socket.

The weld connection arrangement 100 comprises a sealing plug 130 which is inserted into the tubular electrical line 110 at the respective end 110*a*, 110*b* of the tubular electrical line 110, and is welded together with the electrically conductive contact part 120 to the tubular electrical line 110 in order to seal the tubular electrical line 110 against leakage of coolant.

The welded connection arrangement 100 can, for example, form a friction welded connection arrangement, in which the electrically conductive contact part 120 together with the sealing plug 130 is friction welded to the tubular electrical cable 110.

For example, the electrically conductive contact part 120 and the tubular electrical cable 110 can be made of different metals that are welded together.

For example, the tubular electrical conduit 110 and the closure plug 130 may be aluminum and the electrically conductive contact member 120 may be a copper member welded together with the aluminum of the tubular conduit 110 and the aluminum of the closure plug 130.

The electrically conductive contact part 120 can be welded to the tubular electrical cable 110 by means of the sealing plug 130. The electrically conductive contact part 120 can thus form a unit or a molded part with the sealing plug 130 and the electrical cable 110.

The electrically conductive contact part 120 may have a first section 120*a* and a second section 120*b*, as shown in more detail in FIG. 2, which are mechanically rigidly connected to each other. The first section 120*a* of the electrically conductive contact part 120 may be tubular and may be welded to the respective end of the tubular electrical line 110.

The first portion 120*a* may be a tubular hollow body that is welded to an outer surface of the tubular electrical conduit 110 at the respective end 110*a*, 110*b* of the tubular electrical conduit 110. The sealing plug 130 can be attached to the respective end 110*a*, 110*b* in the tubular electrical cable 110 and can be welded to an inner surface of the tubular electrical cable 110. The outer surface here refers to the cylindrical outer surface of the tube 110 at the respective end 110*a*, 110*b*. The inner surface here refers to the cylindrical-shell-shaped inner side of the tube 110 at the respective end 110*a*, 110*b*.

The second section 120*b* can be plate-shaped or form a small plate and have a hole 121 for mechanical and electrical contacting. For example, the plate 120*b* can be screwed or clamped to a pole of the storage medium or the battery via the hole 121 or, for example, attached to a corresponding battery terminal in the vehicle.

FIG. 2 shows a schematic representation of a welded joint arrangement 200 according to the invention, in which both ends 110*a*, 110*b* are in contact.

In contrast to the illustration in FIG. 1, in which only one end 110*a* of the tubular electrical cable 110 is shown in an exploded state, in FIG. 2 both ends 110*a*, 100*b* of the tubular electrical cable 110 are shown in a joined state.

That is, the weld joint assembly 200 comprises a sealing plug 130 at each end 110*a*, 110*b*, which is inserted there into the tubular electrical conduit 110 and is welded to the tubular electrical conduit 110 together with the electrically conductive contact portion 120 to seal the tubular electrical conduit 110 against leakage of coolant at both ends 110*a*, 110*b*.

Figure 3:
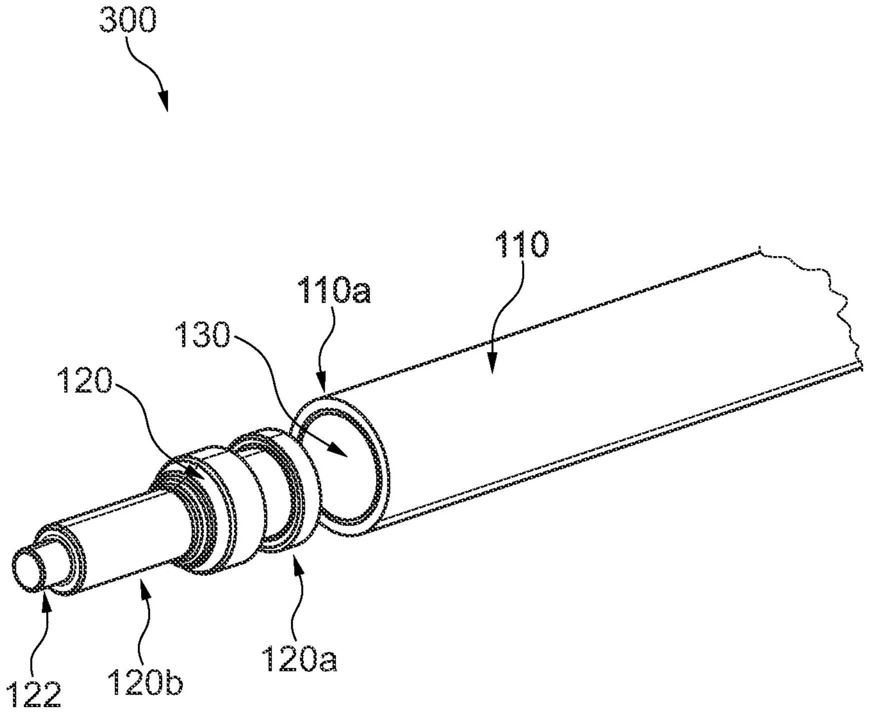
FIG. 3 depicts a schematic representation of a welded joint arrangement 300 according to the invention, in which the electrical contact part is shaped as a friction welding tool.

FIG. 3 shows a schematic representation of a welded joint arrangement 300 according to the invention, in which the electrical contact part is shaped as a friction welding tool.

The welding connection arrangement 300 can correspond to the welding connection arrangement 100 or 200 as described above with respect to FIGS. 1 and 2, with the difference that the electrical contact part 120 can be designed as a friction welding tool at least at one end 110*a*, 110*b*.

As described above, the electrically conductive contact part 120 can have a first section 120*a* and a second section 120*b*, whereby only the first section 120*a* is shown in more detail in FIG. 3, which are mechanically rigidly connected to one another.

The first section 120*a* of the electrically conductive contact part 120 can be formed as a rotationally symmetrical body, which can be shaped as a hollow body or a completely filled body. The rotationally symmetrical body can, for example, be constructed from several cylindrical sections arranged along an axis of rotation (in the x-direction, see FIG. 2), as shown in FIG. 3.

The first portion 120*a* of the electrically conductive contact portion 120 may be welded to the sealing plug 130 on an inner surface of the tubular electrical conduit 110 at the respective end 110*a*, 110*b* of the tubular electrical conduit 110. For example, the sealing plug 130 can be inserted into the tubular electrical line 110 at the respective end 110*a*, 110*b* and welded to the first section 120*a* of the electrically conductive contact part 120, which is also inserted into the tubular electrical line 110.

When manufacturing such a welded connection arrangement, the first section 120*a* of the electrically conductive contact part 120 can be inserted into a friction welding system as a friction welding tool and a friction weld can be produced with the friction welding system. After this friction welding has been produced, the friction welding tool can be removed from the friction welding system and remain in the welding connection arrangement 300 as electrically conductive contact part 120.

As mentioned above, the first section 120*a* may be formed as a rotationally symmetrical friction welding tool.

The friction welding tool can be designed as a CCS ("Combined Charging System") DC PIN, for example.

The second section 120*b* can be a rotationally symmetrical body that has a plug contact 122 for mechanical and electrical contacting. Such a plug contact 122 can, for example, be plugged into an electrical consumer, for example a charging socket, in order to enable electrical contacting with the electrical consumer or the charging socket.

Figure 4:
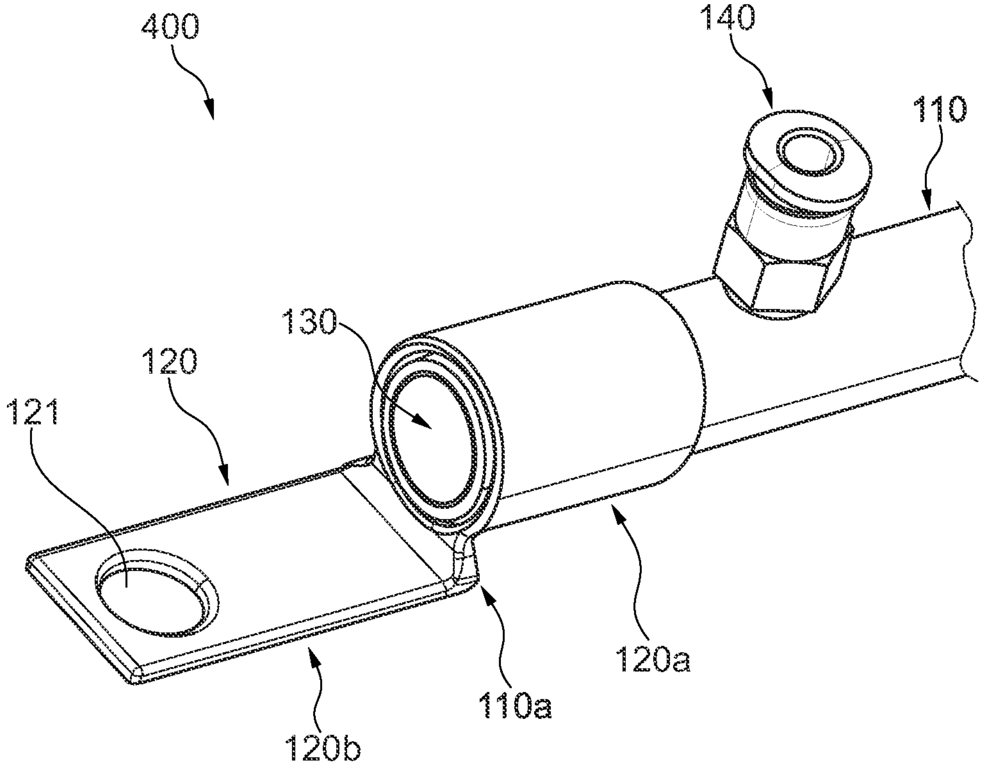
FIG. 4 depicts a schematic representation of a welded joint arrangement 400 according to the invention with a cooling connection on the pipe.

FIG. 4 shows a schematic representation of a welded joint arrangement 400 according to the invention with a cooling connection 140 on the pipe 110.

The welded joint arrangement 400 can correspond to the welded joint arrangement 100 or 200 as described above for FIGS. 1 and 2.

In addition, the tubular electrical conduit 110 may have one or more lateral bores for introducing or discharging coolant. A cooling connection 140 may be provided in the lateral bore to introduce or discharge the coolant into the tubular electrical conduit 110.

A screw with a seal can be screwed, welded or glued into the bore, which forms the cooling connection 140, onto which a coolant line can be plugged or attached in some other way.

With such a cooling connection 140, the coolant can circulate through the cooling connection 140 on the tube 110. As described above with respect to FIGS. 1 and 2, the sealing plug 130 or filler pin closes the end-face connection during friction welding, so that a subsequent bore for the cooling connection 140, as shown here in FIG. 4, may be necessary.

Figure 5:
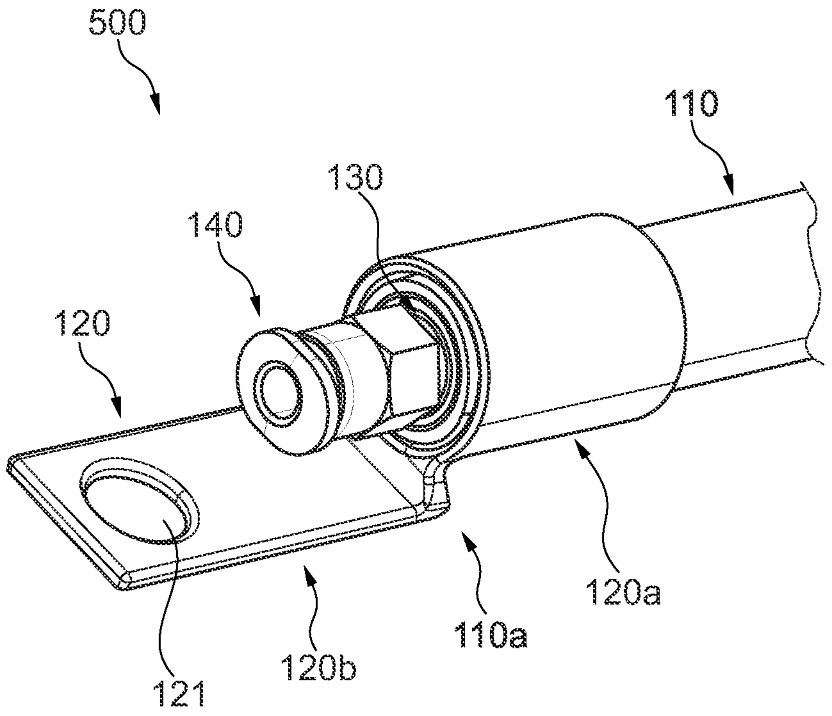
FIG. 5 depicts a schematic representation of a welded joint arrangement 500 according to the invention with a cooling connection pin.

FIG. 5 shows a schematic representation of a welded connection arrangement 500 according to the invention with a cooling connection pin.

The welded joint arrangement 500 can correspond to the welded joint arrangement 100 or 200 as described above for FIGS. 1 and 2.

The sealing plug 130 can have a cooling connection 140 or cooling connection pin in order to introduce the coolant into the tubular electrical line 110. The cooling connection 140 can be attached to the end face of the tube 110. The cooling connection 140 can be constructed in the same way as the cooling connection 140 of FIG. 4. A coolant hose can be connected to the cooling connection pin 140 in order to allow coolant to circulate in the tube 110. The cooling connection pin can establish a material connection to the tube 110 and to the contact part 120 and additionally comprise the cooling connection 140.

Figure 6:
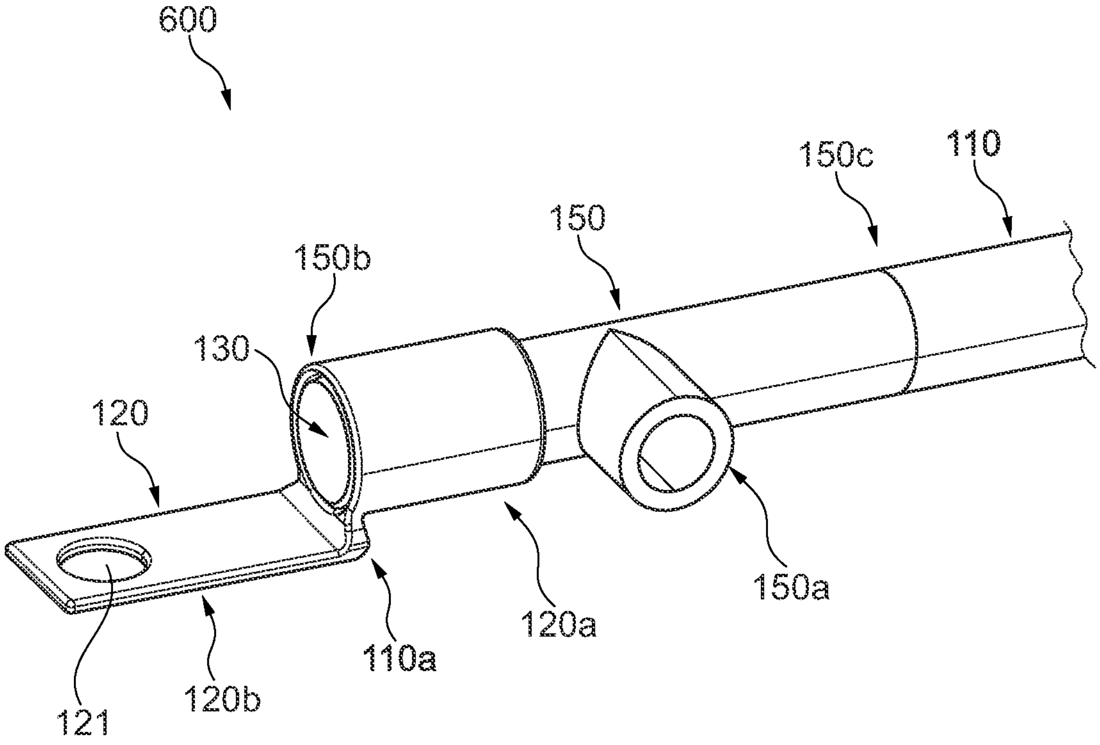
FIG. 6 depicts a schematic representation of a welded joint arrangement 600 according to the invention with a terminal as a T-piece.

FIG. 6 shows a schematic representation of a welded joint arrangement 600 according to the invention with a terminal as a T-piece.

The weld joint arrangement 600 can correspond to the weld joint arrangement 100 or 200 as described above for FIGS. 1 and 2.

In addition, the tubular electrical line 110 can have a T-shaped connection piece 150 with three tubular line connections 150*a*, 150*b*, 150*c* at at least one of the ends 110*a*, 110*b*.

A first cable connection 150*a* of the three tubular cable connections 150*a*, 150*b*, 150*c* can be designed as a coolant connection. A second line connection 150*b* of the three tubular line connections 150*a*, 150*b*, 150*c* can be welded to the electrically conductive contact part 120. A third line connection 150*c* of the three tubular line connections 150*a*, 150*b*, 150*c* can be welded to the tubular electrical line 110.

The terminal can be designed as a T-piece with or without a coolant hose connection. The terminal can be electrically and mechanically connected to the tubular electrical cable 110, for example via a TIG weld (tungsten inert gas weld).

The invention also relates to a method of manufacturing a welded connection arrangement 100, 200, 300, 400, 500, 600 for cooled current transmission from an electrical consumer, for example a charging socket, to a storage medium, for example a battery, for example a battery of an electrically operable vehicle, as described above with respect to FIGS. 1 to 6.

Such a procedure comprises the following steps:

Provision of a tubular electrical line 110 with a first end 110*a* for electrical connection to the electrical consumer, for example the charging socket, and a second end 110*b* for electrical connection to the storage medium, for example the battery, as explained in more detail above, for example with regard to FIGS. 1 and 2, wherein the tubular electrical line 110 is designed to accommodate coolant.

Insertion of a sealing plug 130 at a respective end 110*a*, 110*b* of the tubular electrical cable 110 into the tubular electrical cable 110, as explained in more detail, for example, above with respect to FIGS. 1 and 2.

Attaching an electrically conductive contact part 120 to a respective end 110*a*, 110*b* of the tubular electrical line 110 for electrically contacting the tubular electrical line 110, as explained in more detail, for example, above with respect to FIGS. 1 and 2.

Welding of the sealing plug 130 together with the electrically conductive contact part 120 to the tubular electrical line 110 at the respective end 110*a*, 110*b* of the tubular electrical line 110 in order to seal the same against an escape of coolant, as explained in more detail, for example, above with respect to FIGS. 1 and 2.

The welding may comprise friction welding, in which the electrically conductive contact part 120 together with the sealing plug 130 is friction welded to the tubular electrical cable 110.

The method may further comprise the following step: Attaching a cooling port 140 to the tubular electrical conduit 110 and introducing or discharging coolant into the tubular electrical conduit via the cooling port 140, for example as discussed in more detail above with respect to FIGS. 4 and 5.

Since the devices and methods described in detail above are examples of embodiments, they can be modified to a wide extent by the skilled person in the usual manner without leaving the scope of the invention. In particular, the mechanical arrangements and the proportions of the individual elements with respect to each other are merely exemplary. Some preferred embodiments of apparatus according to the invention have been disclosed above. The invention is not limited to the solutions explained above, but the innovative solutions can be applied in different ways within the limits set by the claims.

What is claimed is:

1. A weld joint assembly for cooled power transmission from an electrical load to a storage medium, the weld joint assembly comprising:

a tubular electrical line configured to conduct electricity and to accommodate a coolant configured and arranged to cool the tubular electrical line, the tubular electrical line comprising a first end configured to electrically connect to an electrical consumer and a second end configured to electrically connect to a storage medium;

an electrically conductive contact member arranged attached to a respective end of the tubular electrical lead and configured to electrically contact the tubular electrical lead; and a sealing plug arranged inserted into the tubular electrical line at the first end or the second end and welded together with the electrically conductive contact part to the tubular electrical line in order to seal the tubular electrical line against leakage of coolant.

2. The weld joint assembly according to claim 1, further comprising a friction-welded connection arrangement in which the electrically conductive contact part together with the sealing plug is friction-welded to the tubular electrical line.

3. The weld joint assembly according to claim 1, wherein the electrically conductive contact part and the tubular electrical line comprise different metals welded together.

4. The weld joint assembly according to claim 1, wherein the tubular electrical lead and the sealing plug comprise aluminum and the electrically conductive contact part comprises a copper part welded together with the aluminum of the tubular lead and the aluminum of the sealing plug.

5. The weld joint assembly according to claim 1, wherein the electrically conductive contact part is arranged welded to the tubular electrical cable by means of the sealing plug.

6. The weld joint assembly according to claim 1, wherein:

the electrically conductive contact part comprises a first section and a second section mechanically and rigidly connected to one another; and the first portion is tubular and is welded to the first end or the second end of the tubular electrical cable.

7. The weld joint assembly according to claim 6, wherein:

the first portion comprises a tubular hollow body welded to an outer surface of the tubular electric wire at the first end or the second end of the tubular electric wire; and the sealing plug is arranged attached to the first end or the second end in the tubular electrical cable and is welded to an inner surface of the tubular electrical cable.

8. The weld joint assembly according to claim 6, wherein the second section is plate-shaped and comprises a bore configured for mechanical and electrical contacting.

9. The weld joint assembly according to claim 6, wherein the first portion comprises a rotationally symmetrical body welded at the first end or the second end of the tubular electrical lead to the sealing plug on an inner surface of the tubular electrical lead.

10. The weld joint assembly according to claim 6, wherein the first section is shaped as a rotationally symmetrical friction welding tool.

11. The weld joint assembly according to claim 6, wherein the second section comprises a rotationally symmetrical body comprising a plug contact configured for mechanical and electrical contacting.

12. The weld joint assembly according to claim 1, wherein:

the tubular electrical cable comprises at least one lateral bore for the introduction of coolant; and a cooling connection is arranged in the lateral bore and configured to lead the coolant into or out of the tubular electrical line.

13. The weld joint assembly according to claim 1, wherein the sealing plug comprises a cooling connection arranged and configured to introduce the coolant into the tubular electrical line.

14. The weld joint assembly according to claim 1, wherein the tubular electrical line comprises a T-shaped connection piece comprising three tubular line connections and at least one of the ends.

15. The weld joint assembly according to claim 14, wherein:

a first line connection of the three tubular line connections comprises a coolant connection, a second lead terminal of the three tubular lead terminals is arranged welded to the electrically conductive contact portion; and a third cable connection of the three tubular cable connections is arranged welded to the tubular electrical cable.

16. A method of manufacturing a welded joint assembly for cooled power transfer from an electrical load to a storage medium, the method comprising the steps of:

providing a tubular electrical line with a first end configured for electrical connection to an electrical consumer and a second end configured for electrical connection to a storage medium, the tubular electrical line configured to accommodate coolant;

inserting a sealing plug at the first end or the second end into the tubular electrical cable;

attaching an electrically conductive contact member to the first end or the second end of the tubular electric wire thereby enabling electrical contacting with the tubular electric wire; and welding the sealing plug together with the electrically conductive contact part to the tubular electrical line at the first end or the second end of the tubular electrical line in order to seal the same against leakage of coolant.

17. The method according to claim 16, wherein the welding comprises friction welding, and the method further comprises the step of friction welding the electrically conductive contact part and the closure plug to the tubular electrical line.

18. The method according to claim 16, further comprising the steps of attaching a cooling connection to the tubular electrical line and introducing or discharging coolant via the cooling connection into the tubular electrical line.

* * * * *